O. G. OST.
ANTISKIDDING DEVICE.
APPLICATION FILED MAR. 4, 1915.
1,147,182.
Patented July 20, 1915.
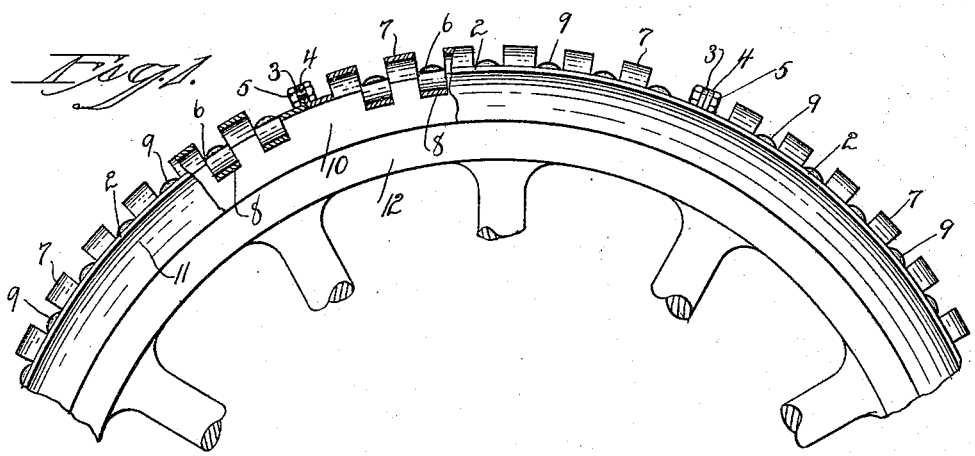
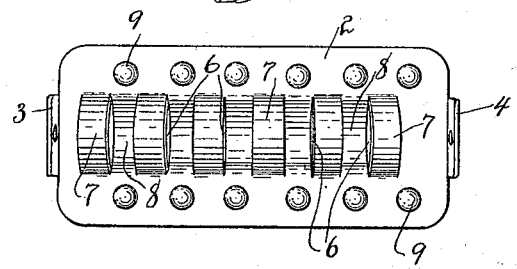
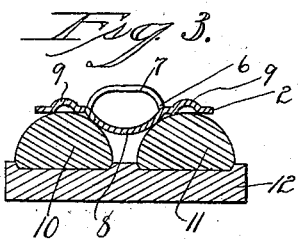
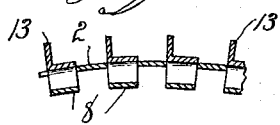
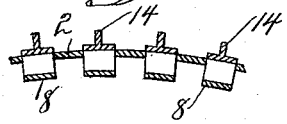
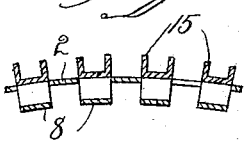
Witnesses
M. P. Nichols
C. L. Weed
Inventor
Otto G. Ost
by Seymour Earle
Atty

UNITED STATES PATENT OFFICE.

OTTO G. OST, OF MERIDEN, CONNECTICUT.

ANTISKIDDING DEVICE.

1,147,182.  Specification of Letters Patent.  Patented July 20, 1915.

Application filed March 4, 1915. Serial No. 12,220.

*To all whom it may concern:*

Be it known that I, OTTO G. OST, a citizen of the United States, residing at Meriden, in the county of New Haven and State of Connecticut, have invented a new and useful Improvement in Antiskidding Devices; and I do hereby declare the following, when taken in connection with the accompanying drawings and the characters of reference marked thereon, to be a full, clear, and exact description of the same, and which said drawings constitute part of this application, and represent, in—

Figure 1 a side view partly in section of a portion of a wheel showing my improved skidding device applied thereto. Fig. 2 a plan view of one of the plates, detached. Fig. 3 a transverse sectional view of my anti-skidding device shown in connection with a double tire. Figs. 4, 5 and 6, are broken sectional views illustrating modified forms of gripping edges.

This invention relates to an improvement in anti-skidding devices for automobile wheels, and particularly for wheels which are provided with double tires, such as are commonly used on heavy trucks.

The object of this invention is to provide an anti-skidding device which may be readily applied to double tired wheels and which will remain in place and withstand the strain imposed upon it by heavy loads; and the invention consists in the construction hereinafter described and particularly recited in the claims.

In carrying out my invention, I employ a series of plates 2, more or less in number, according to the size of the wheel. These plates are provided at opposite ends with outwardly projecting lugs 3, 4, which may be abutted together and connected by bolts 5, whereby the sections are connected together. In each plate are a series of transverse slits 6 forming a series of alternate bars 7, 8. The bars 8 are struck inwardly, while the bars 7 are struck outwardly. Preferably and as shown in Figs. 2 and 3 of the drawings, a series of projections 9 will be struck outward from the opposite sides of the plate, these projections preferably being in line with the bars 8 and assist in causing the device to grip the road; and furthermore, by striking the metal outward the plates are strengthened in the same manner as would be accomplished by corrugations. The bars 8 are arranged and adapted to extend between the tires 10 and 11 of a double tired wheel 12. The sides of the plate rest upon the outer periphery of the tires and the bars 7 projecting outward, will grip the road so as to prevent skidding and assist in causing the wheels to grip the road in hill climbing.

Instead of forming the bars 7 by striking portions of the plate outward, these gripping teeth or edges may be formed from short strips of angle irons 13 as indicated in Fig. 4 of the drawings; or instead of employing angle irons 13, T irons 14 may be employed as indicated in Fig. 5 of the drawings; or channel irons 15 may be used as indicated in Fig. 6 of the drawings. In either case these angle irons, T irons or channel irons will be securely riveted to the plate and slightly bowed longitudinally and have practically the same effect in gripping the road and prevent skidding as does the construction first described.

It will be noted that the ends 3 and 4 when coupled together, produce in effect, an additional bar or gripper, and these bars or grippers being equally spaced, prevent undue strain and unnecessary wear on the tires.

I claim:—

1. The combination with a wheel and double tire, of an anti-skidding device comprising a series of bowed plates surrounding the outside of the tire, the ends of the plates abutted and coupled together, said plates transversely slotted so as to form a series of bars a portion of which are struck inward from the body of the plate between the treads of the tire, the said plates also provided with a series of closely arranged transverse bars projecting radially outward beyond the face of the tire.

2. The combination with a wheel and double tire, of an anti-skidding device comprising a series of bowed plates surrounding the outside of the tire, the ends of the plates abutted and coupled together, said plates transversely slotted so as to form a series of transverse bars a portion of which are struck inward from the body of the plate between the treads of the tire and a portion struck outward beyond the outer face of the said plate and so as to project beyond the face of the tire.

In testimony whereof, I have signed this specification in the presence of two subscribing witnesses.

OTTO G. OST.

Witnesses:
FREDERIC C. EARLE,
MALCOLM P. NICHOLS.